(12) United States Patent
Sachdev et al.

(10) Patent No.: US 8,454,078 B2
(45) Date of Patent: Jun. 4, 2013

(54) AUTOMOTIVE VEHICLE DOOR CONSTRUCTION

(75) Inventors: Anil K. Sachdev, Rochester Hills, MI (US); Chih-Cheng Hsu, Rochester Hills, MI (US); Sooho Kim, Troy, MI (US); Raja K Mishra, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 369 days.

(21) Appl. No.: 12/619,893

(22) Filed: Nov. 17, 2009

(65) Prior Publication Data

US 2011/0113697 A1 May 19, 2011

(51) Int. Cl.
*B60J 5/04* (2006.01)
(52) U.S. Cl.
USPC ............. 296/146.6; 296/187.12; 49/502
(58) Field of Classification Search
USPC ............. 296/187.01, 187.03, 187.04, 107.12, 296/193.05, 193.03, 146.6, 187.12, 146.5, 296/146.1; 49/501, 502
See application file for complete search history.

(56) References Cited

U.S. PATENT DOCUMENTS

| 5,122,196 | A | * | 6/1992 | Fernandez | 148/552 |
|---|---|---|---|---|---|
| 5,536,060 | A | | 7/1996 | Rashid et al. | |
| 5,580,120 | A | | 12/1996 | Nees et al. | |
| 6,086,690 | A | * | 7/2000 | Wycliffe et al. | 148/552 |
| 6,846,033 | B2 | | 1/2005 | Chu et al. | |
| 2002/0073627 | A1 | * | 6/2002 | Hock | 49/502 |
| 2003/0189357 | A1 | * | 10/2003 | Patberg et al. | 296/146.6 |
| 2004/0195860 | A1 | * | 10/2004 | Koellner et al. | 296/146.5 |
| 2005/0212324 | A1 | * | 9/2005 | Mittermeier et al. | 296/146.5 |
| 2008/0308424 | A1 | * | 12/2008 | Suzuki et al. | 205/171 |
| 2010/0045066 | A1 | * | 2/2010 | Gress et al. | 296/146.5 |
| 2010/0276543 | A1 | * | 11/2010 | Schimmler et al. | 244/129.5 |

* cited by examiner

*Primary Examiner* — Glenn Dayoan
*Assistant Examiner* — Sunsurraye Westbrook
(74) *Attorney, Agent, or Firm* — BrooksGroup

(57) ABSTRACT

One embodiment includes a lightweight automotive vehicle door construction including an inner panel partially formed from a lightweight metal casting. The casting provides a toe pan, hinge pillar and beltline. A lightweight stamping connected with the casting provides a remainder of the inner skin. The stamping provides an opposite pillar and latch mount. A header connected to the casting along a first end and with the beltline at a second end provides a window frame. A side intrusion beam extends between the hinge pillar and the opposite pillar. An outer panel is connected with the inner panel.

20 Claims, 3 Drawing Sheets

AUTOMOTIVE VEHICLE DOOR CONSTRUCTION

TECHNICAL FIELD

The field to which the disclosure generally relates includes automotive vehicle doors.

BACKGROUND

To increase fuel economy there has been a constant quest to reduce the weight of vehicle bodies by using aluminum or other lightweight materials in vehicle doors. Most vehicle doors have a planar or slightly curved outer panel or skin that forms a spatial envelope with a stamped complexly formed inner panel or skin. Currently, door inner panels made from aluminum or magnesium sheet need reinforcements in areas adjacent to the hinge pillar. Additionally aluminum inner door skins remained a technical challenge due to the large drawing strain required in stamping the inner panel.

SUMMARY OF EXEMPLARY EMBODIMENTS OF THE INVENTION

One embodiment includes a lightweight automotive vehicle door construction including an inner panel partially formed from a lightweight metal casting. The casting provides a toe pan, hinge pillar and beltline. A remainder of the inner skin is provided by a lightweight stamping connected with the casting. The stamping provides an opposite pillar and latch mount. A header connected to the casting along a first end and with the beltline at a second end provides a window frame. A side intrusion beam extends between the hinge pillar and the opposite pillar. An outer skin is connected with the inner skin.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1:
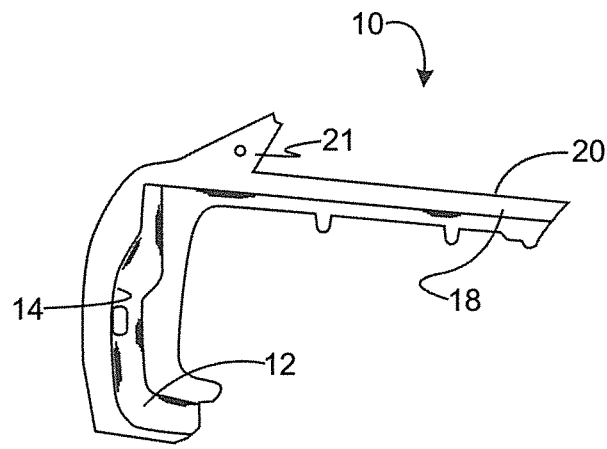
FIG. 1 is a perspective view of a casting utilized in a door construction according to one embodiment.
Figure 2:
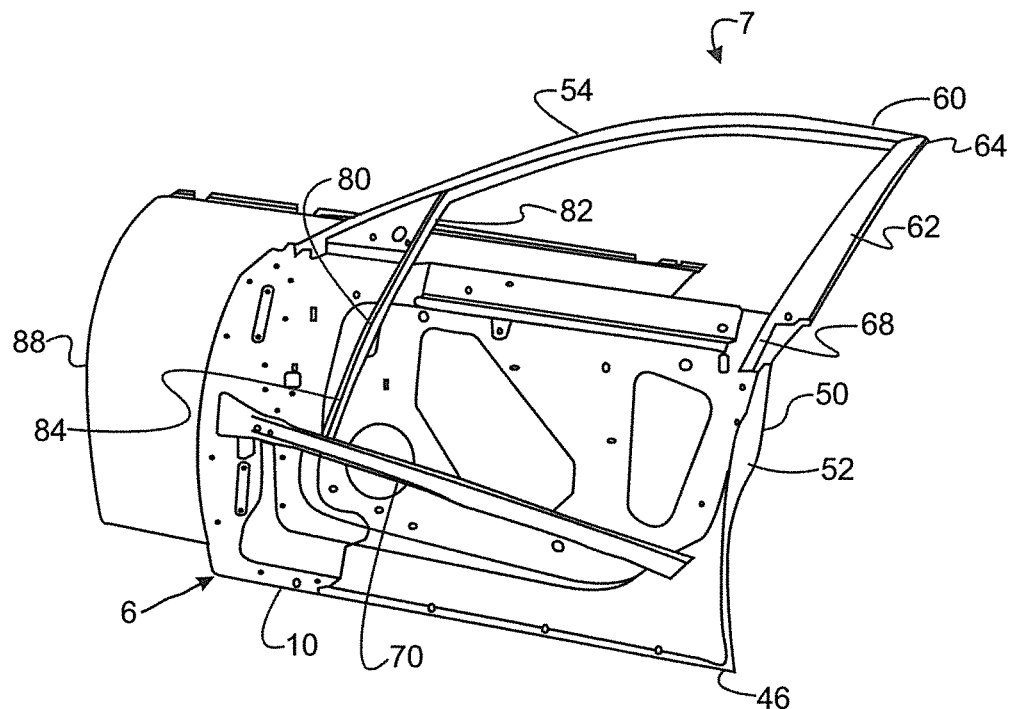
FIG. 2 is a perspective view a door construction according to one embodiment with an outer skin uninstalled.
Figure 3:
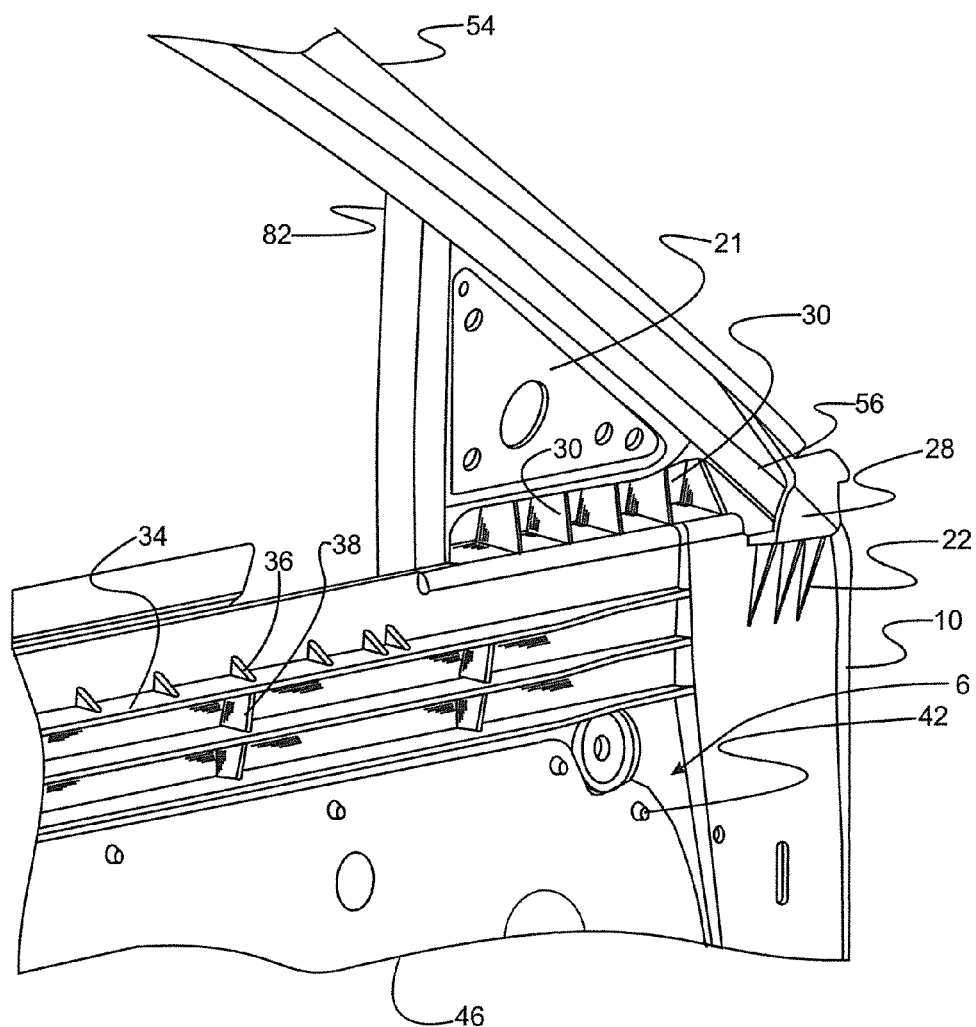
FIG. 3 is a partial enlarged rear perspective view of a portion the casting and a stamping utilized in a door construction shown in FIG. 2.

Referring to FIGS. 1-3 a construction of a lightweight automotive vehicle door 7 is illustrated according to one embodiment. The door is shown in its "door in white" configuration before the hardware is installed on the door envelope. The door 7 includes an inner panel 6 formed partially by a thin-walled casting 10. The casting 10 may include a toe pan section 12 connected with a front hinge pillar 14. The hinge pillar 14 and toe pan 12 form part of a front part of the inner panel of the door 7.

The casting 10 also may have an inner beltline 18 and optionally an outer beltline 20. A mirror mount 21 may be connected with the inner beltline 18. Preferably the casting 10 is molded from a lightweight metal such as aluminum or magnesium or alloys there of. The thickness of the casting 10 may be 0.5-4 millimeters according to one embodiment.

The casting 10 in higher stressed areas can have reinforcement ribs. Ribs 22 reinforced the casting 10 in an area that provides a header anchor 28. Ribs 30 reinforced the casting an area of the mirror mount 21. Horizontal ribs 34 and transverse ribs 36 and 38 reinforce the inner beltline 18. The casting 10 also may have a series of nubs 42 that are utilized to connect an inner stamping 46.

The inner stamping 46 provides a remainder of the door inner skin. The inner stamping 46 may have a series of holes that are fitted over the nubs 42 of the casting. The nubs 42 are then pressed to deform to rivet connect the inner stamping 46 to the casting 10. The inner stamping 46 is typically fabricated from a lightweight metal such as aluminum or magnesium. The thickness of the inner stampings 46 may be 1 to 2 mm according to one embodiment. The inner stamping may form an opposite or rear pillar 50 of the inner panel as well as providing a latch mount 52.

A header 54 may provide a window frame. The header 54 may have a first end 56 held in the anchor 28 of the mirror mount. The header 54 may be steel or a lightweight metal such as aluminum or magnesium or alloys thereof. The header second end 60 may be connected with the stamping 46 up to any location via with a rear window guide 62 depending on functional performance requirements. The rear window guide 62 may have a top end 64 connected with the header 54. The rear window guide may have a second lower end 68 connected with the inner beltline 18 at anchor 28.

Extending between the front hinge pillar 14 and the rear pillar 50 may be a side intrusion beam 70. The side intrusion beam 70 may be fabricated from steel according to one embodiment.

Figure 5:
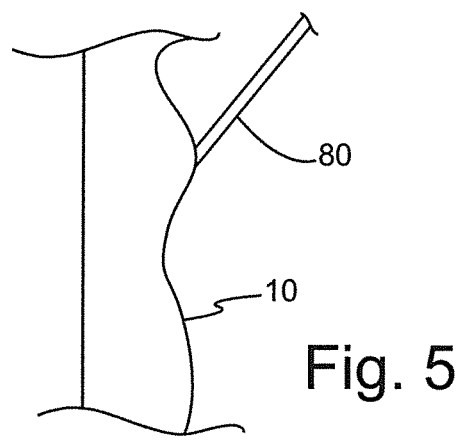
FIG. 5 is a partial view a door construction of an alternate wherein a front door guide lower end is connected with a casting according to one embodiment.

Along a front end of the door 7 may be a front window guide 80. A top end 82 of the front window guide may be connected with the mirror mount 21 and a bottom end 84 may be connected with the inner stamping 46 or with the casting 10 (FIG. 5).

A lightweight outer skin 88 completes the door 7. The outer panel 88 may be any metal such as steel or a lightweight metal such as aluminum or magnesium according to one embodiment. To minimize weight at the lowest cost the outer skin may be fabricated from aluminum.

Figure 4:
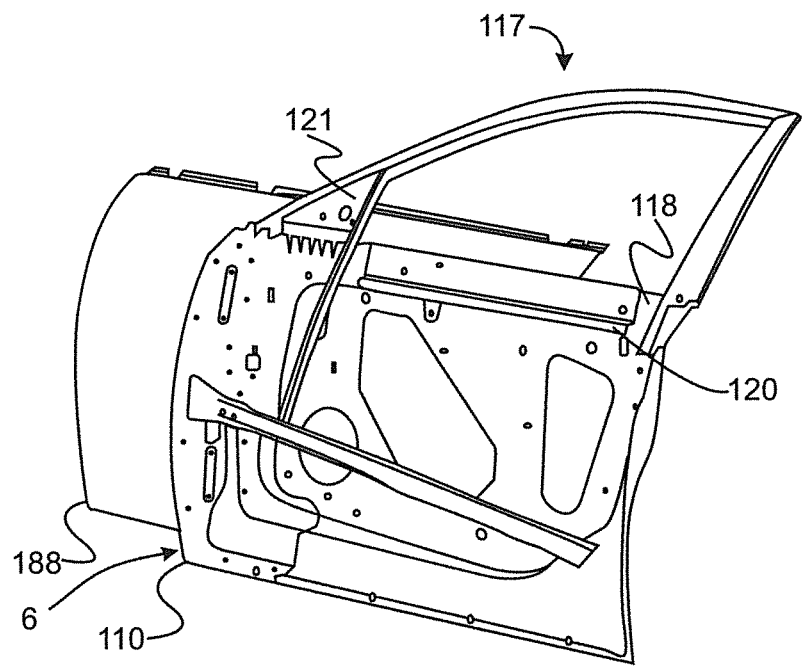
FIG. 4 is a perspective view a door construction with an outer skin uninstalled according to another embodiment.

FIG. 4 illustrates an alternative embodiment of a door 117. The door 117 may have a casting 110 with a mirror mount 121 and an inner beltline 118. An outer beltline reinforcement may be provided by a steel stamping 120 that is connected with the outer skin 188. The material and construction used for a remainder of the door 117 may be substantially similar to that described for the door 7.

The above description of embodiments of the invention is merely exemplary in nature and, thus, variations thereof are not to be regarded as a departure from the spirit and scope of the invention.

The invention claimed is:

1. A lightweight automotive vehicle door construction comprising:
   an inner panel including:
      a lightweight thin-wall metal casting including a toe pan, hinge pillar and beltline forming a partial inner panel; and
      an inner stamping connected with said casting providing a remainder of said inner panel and an opposite pillar and latch mount;
   a header providing a window frame connected to said casting along a first end and with said beltline at a second end;
   a side intrusion beam extending between said casting hinge pillar and said opposite pillar; and
   an outer panel connected with said inner panel.

2. An automotive vehicle door construction as described in claim 1 wherein said casting comprises at least one of aluminum, magnesium or alloys thereof.

3. An automotive vehicle door construction as described in claim 1 wherein said outer panel comprises aluminum.

4. An automotive vehicle door construction as described in claim 1 wherein said casting comprises inner and outer beltlines.

5. An automotive vehicle door construction as described in claim 1 wherein said casting comprises reinforcement ribs.

6. An automotive vehicle door construction as described in claim 1 wherein said casting comprises a mirror mount.

7. An automotive vehicle door construction as described in claim 6 wherein said mirror mount comprises reinforcement ribs.

8. An automotive vehicle door construction as described in claim 1 wherein said beltline comprises reinforcing ribs.

9. An automotive vehicle door construction as described in claim 1 wherein said stamping has holes fitted over nubs of said casting and wherein said nubs are pressed to rivet connect said stamping with said casting.

10. An automotive vehicle door construction as described in claim I wherein said casting provides an inner beltline and a plate connected with said outer panel reinforces an outer beltline.

11. An automotive vehicle door construction as described in claim 1 wherein said header is fabricated from a lightweight metal.

12. An automotive vehicle door construction as described in claim 1 wherein said casting has a mirror mount and a front window guide is connected with said mirror mount.

13. An automotive vehicle door construction as described in claim 12 wherein said front window guide along a lower end is connected with said casting.

14. An automotive vehicle door construction as described in claim 1 wherein said header is connected with said beltline via a rear window guide.

15. A lightweight automotive vehicle door comprising:
   an inner panel including:
      a thin-wall lightweight metal casting comprising at least one of aluminum or magnesium, said casting including a toe pan, hinge pillar, mirror mount and inner beltline, said casting being rib reinforced, said casting having nubs; and
      an inner stamping having holes fitted over said nubs and being rivet connected with said casting providing a remainder of an inner door skin and an opposite pillar and latch mount;
   a header connected to said casting at a first end and with said inner beltline at a second end via a window guide, said header providing a window frame;
   a side intrusion beam extending between said casting hinge pillar and said opposite pillar; and
   an outer panel connected with said inner panel.

16. A lightweight automotive vehicle door as set forth in claim 15 wherein the outer panel comprises aluminum.

17. An automotive vehicle door construction as set forth in claim 1 wherein the metal casting comprises magnesium.

18. An automotive vehicle door construction as set forth in claim 15 wherein the metal casting comprising an alloy comprising aluminum and magnesium.

19. An automotive vehicle door construction as set forth in claim 1 wherein the metal casting comprises magnesium.

20. An automotive vehicle door construction as set forth in claim 15 wherein the metal casting comprising an alloy comprising aluminum and magnesium.

* * * * *